Jan. 17, 1961     H. L. ETCHELL     2,968,100
CHECKING GAUGE
Filed July 5, 1957     2 Sheets-Sheet 1
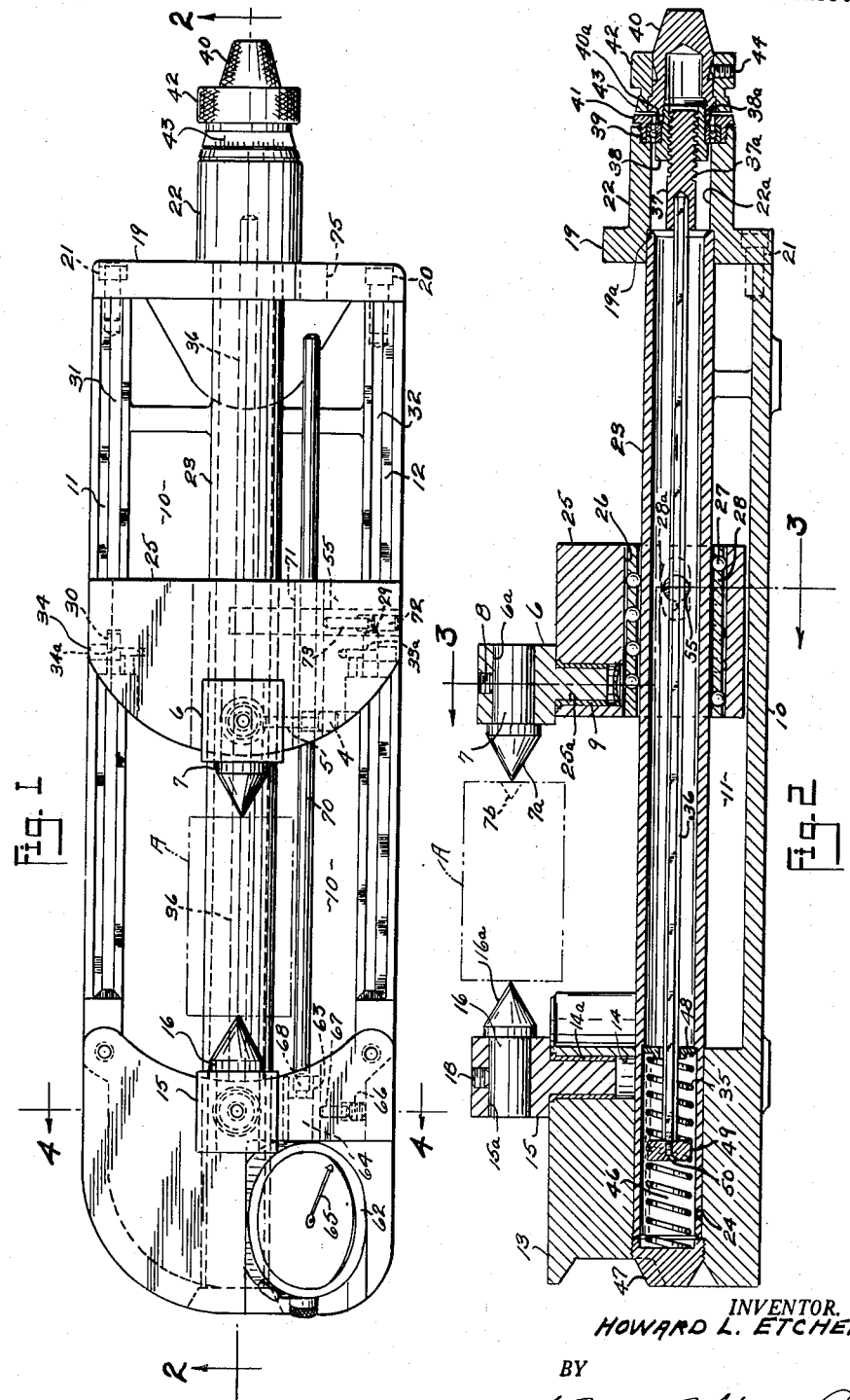
INVENTOR.
HOWARD L. ETCHELL
BY
Hyde, Meyer, Baldwin & Doran
ATTORNEYS Jan. 17, 1961   H. L. ETCHELL   2,968,100
CHECKING GAUGE Filed July 5, 1957   2 Sheets-Sheet 2

INVENTOR.
HOWARD L. ETCHELL
BY
Hyde, Meyer, Baldwin & Doran
ATTORNEYS ated Jan. 17, 1961

United States Patent Office 2,968,100
Patented Jan. 17, 1961

2,968,100

CHECKING GAUGE

Howard L. Etchell, Maple Heights, Ohio, assignor to Bedford Gear and Machine Products, Inc., Bedford, Ohio, a corporation of Ohio Filed July 5, 1957, Ser. No. 670,239

18 Claims. (Cl. 33—147)

This invention relates to measuring and gauging apparatus and more particularly to a gauge designed for accurately determining the dimensions of objects which must be manufactured within close tolerances.

To obtain accurate and true gauge readings, it is necessary that the gauge exert as little pressure as possible against the walls of a specimen being measured in order to prevent indentation of the article by the gauge means. Even the slightest additional pressure exerted on the test specimen by the gauge contacts is apt to indent the side wall of the test specimen and give an untrue gauge reading for the dimensions of the article.

It is an object of my invention, therefore, to provide an improved gauging apparatus which is capable of exerting the minimum required compressive force against the walls of the test specimen and one which will give true and accurate readings of the dimensions of the test specimen.

Another object of the present invention is to provide a gauging apparatus of the dial indicator type which will exert a controlled and measurable force against the walls of a test specimen and thereby indicate precise and accurate readings of the dimensions of the test specimen.

Another object of the present invention is to provide a measuring apparatus by which dimensions of various test specimens may be measured expeditiously and with a high degree of accuracy, and one which may be used by a relatively inexperienced operator.

A further object of the present invention is to provide a gauging apparatus having frictionless bearing means between its supporting structure and movable gauging member whereby accurate measurement of a test specimen will not be inhibited by friction between said supporting structure and movable gauging member.

Still another object of the present invention is to provide a measuring device characterized by its structural simplicity, the ease of assembly of its parts, its strong and sturdy nature and its low manufacturing cost. Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 1 is a top plan view of a measuring instrument or gauging apparatus embodying the present invention.

Fig. 2 is a longitudinal vertical sectional view taken along the plane of line 2—2 of Fig. 1.

Figure 3:
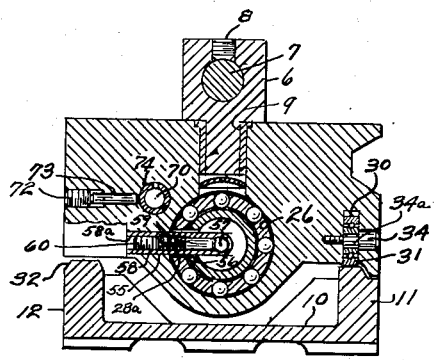
Fig. 3 is a transverse vertical sectional view taken along the planes of the broken line 3—3 of Fig. 2.

Before describing in detail the herein disclosed embodiment of the invention, it is to be understood that the present invention is not limited to the structural details or the particular arrangement of parts herein shown, as devices embodying the present invention may take other forms. It also is to be understood that the phraseology and terminology herein used are for purposes of description and not of limitation, as the scope of the present invention is denoted by the appended claims.

The present invention may be said to contemplate a gauge having a fixed and a movable gauge member, said gauge members being normally spaced apart and adapted to be moved together through suitable resilient means in a manner wherein they cooperate with an object to be measured. The gauge is constructed so that the size of the object, as determined by the movement of the movable gauge members, is directly indicated by a suitable indicating means.

The gauging apparatus according to the invention comprises a supporting structure preferably of metal and including a base 10 of rigid construction consisting of an elongated bed plate having spaced upstanding side members 11 and 12 extending along opposite sides thereof. At the left end of the gauging apparatus, as seen in Figs. 1 and 2, the base 10 is formed with an integral upstanding end portion 13, forming a stationary gauging block which is substantially perpendicular to the base 10 and has approximately the same width. The upstanding end portion 13 has a flat horizontal top surface which is provided with a downwardly extending vertical bore 14. A gauge element 15 projects vertically upwardly from the end portion 13 and has a lower shank portion thereof snugly received within said bore 14. The gauge element includes a work contacting member 16 having a point 16a for engagement with a workpiece and a cylindrical body portion which is adapted to be received in a bore 15a of gauge element 15 and is retained therein by means of a set screw 18. The bore 14 is provided with a suitable sleeve member 14a which frictionally engages and removably retains the lower portion of said gauge element.

An upstanding end member 19 is secured by means of screws 20 and 21 to the right-hand end of the base 10, as shown in Figs. 1 and 2. The end member 19 is provided with a cylindrical housing portion 22 which projects outwardly to the right from the end member 19, as seen in Figs. 1 and 2. The cylindrical housing 22 contains a bore 22a which extends therethrough with its axis parallel to the longer dimension of the base 10.

Guide means in the form of a horizontal center guide tube 23, positioned parallel to and spaced above the top of the base 10, extends between the integral upstanding end portion 13 and the end member 19. One end of guide tube 23 is received in a through bore 24 provided in the integral upstanding end portion 13 while the other end thereof is received in bore 22a of upstanding end member 19 by press fitting or by turning up plug 47 so as to hold one end of the tube tightly against shoulder 19a in end member 19. The guide tube 23 is hollow and spaced substantially centrally between the side walls 11 and 12 of the base 10. The axial center line of the guide tube, as seen in Fig. 2, is located a distance above the upper surface of the upstanding side wall members 11 and 12.

Slidably mounted on the guide tube 23 above the base 10 for reciprocating longitudinal movement, is a movable gauge block 25. The movable gauge block 25 is provided with a vertical bore 25a in its top surface which is adapted to receive a gauge element 6. This element projects vertically upwardly from the top of the gauging block and is itself provided with a horizontal bore 6a, A work contacting member 7 having a point 7a and a cylindrical body portion is received within the bore 6a and retained therein by means of a set screw 8. The bore 25a is provided with a sleeve member 9 which snugly receives the lower portion of the gauge element 6. A set screw 4 is adapted to exert pressure on a rod 5 which engages sleeve 9 for the purpose of retaining the gauge element therein, as seen in Fig. 1. The gauge block 25 is provided with a central axially extending bore 26 which is adapted to receive frictionless means here shown as ball bearings 27 and a cage or ball retainer 28.

As seen in Fig. 2, the balls 27 are disposed between the outer surface of the guide tube 23 and the inner surface of bore 26 which is provided in the gauge block 25. The balls extend in spaced relationship circumferentially around the inner surface of the bore 26 and support the gauge block 25 on the guide tube 23. The bearings 27 and their associated cage 28 are capable of endwise movement independent of relative movement between the movable gauge block 25 and the guide tube 23. The balls 27 snugly fill the space between tube 23 and bore 26.

In addition to the central frictionless support provided for the movable gauge block 25 by ball bearings 27 and guide tube 23, the gauge block 25 is supported adjacent its side edges by suitable frictionless means which here take the form of roller bearings 29 and 30 journalled for rotation in suitable grooves provided in the block 25. The roller bearings 29 and 30 are supported on guideways 31 and 32 respectively, said guideways being formed by the upper surfaces of the upstanding side members 11 and 12 of the base 10.

Means is preferably provided for adjustably mounting at least one of these bearings, or preferably both sets of roller bearings 29 and 30 so that a three-point frictionless engagement may be readily achieved between the gauge block 25 on the one hand, and guide tube 23 and the guideways 31 and 32 on the other. The adjustable means for the roller bearings 29 and 30 here take the form of eccentric shafts 33 and 34 respectively. The shafts 33 and 34 are identical, so that only one will be described in detail. Shaft 34 has one end threaded for engagement with the gauge block 25. The shaft also has an enlarged central portion 34a eccentrically mounted and axially offset with respect to the threaded portion thereof. The central portion 34a rotatably supports bearing 30. Thus, by rotating the shaft 34 by means of a suitable head portion provided thereon, the eccentrically mounted enlarged central portion 34a may be vertically raised or lowered so that the roller bearing 30 associated therewith may be adjusted to always contact guideway 31. It will be understood that the guide tube 23 and the two spaced guideways 31 and 32 extend longitudinally of the gauging device and parallel with respect to one another. Thus, it will be seen that the gauge block 25 may at all times be adjusted so as to be supported at three points for movement toward and away from the stationary block 13.

Means is provided for moving the movable gauge block 25 along the guide tube so that it may be resiliently held under a predetermined pressure against the test specimen. Said means here takes the form of an adjusting rod 36 which is preferably solid and non-circular, here hexagonal, in cross-sectional shape and extends longitudinally of the gauge axially through the guide tube 23 and is mounted for relative longitudinal movement with respect thereto. The adjusting rod 36 is rigidly secured at its right end, as seen in Figs. 1 and 2, to a coaxially extending member 37 which is provided with threads 37a at its end opposite that engaging adjusting rod 36. A spindle or nut member 38 is provided with a threaded inner bore which engages the threaded end of the member 37 and is mounted for rotation in a roller bearing 39. Threadedly secured at 38a to the spindle member 38 is a finger engageable adjusting nut or wheel 40 having a knurled outer surface. A roller bearing retainer collar 41 threadedly engages the outer end of the cylindrical housing 22 and retains the roller bearing 39 adjacent the right end of said cylindrical housing 22. It will be understood that the spindle member 38 is freely rotatable within the housing 22, but is locked against movement longitudinally of the cylindrical housing 22 due to its engagement with the adjustable nut member 40 which has a raised shoulder 40a thereof engaging the roller bearing member 39. A knurled ring member 42 having a scale 43 divided into sub-divisions, which indicates ounces and pounds of pressure exerted by a spring 35, fits over the adjustable nut member 40 and is secured thereto by means of a set screw 44. By holding the adjusting rod 36 against rotation, as hereinafter described, it is possible by rotating the adjustable nut member 40, to impart axial movement to the adjusting rod 36, through member 37, independently of the tubular guide member 23.

Means is provided for supporting the left end of the adjusting rod 36, as seen in Figs. 1 and 2. The spring 35 is supported within a spring chamber 46 provided in the left end of the guide tube member 23. The left end of the spring, as seen in Fig. 2, abuts a removable plug 47 which threadedly engages the integral upstanding end portion 13 while the other end of the spring engages a partition 48 which is secured against a shoulder within the bore of the guide tube 23. The partition 48 is provided with a central bore through which the adjusting rod 36 extends. As seen in Fig. 2, the end of the adjusting rod is provided with an enlarged disk member 49 which is rigidly secured thereto by means of a screw 50. The disk member 49 is provided with a helical groove having the same pitch as the coils of the spring 35. The helical groove of the disk member 49 is engaged by, and preferably soldered to, at least one of the coils of the spring and thereby secures the adjusting rod 36 to the spring 35. Preferably, the disk member 49 is secured at the midportion of the spring so that approximately an equal number of coils are provided on each side thereof. With this construction, it is possible for the coil spring 35 to provide a neutralizing effect upon the adjusting rod 36. For example, if the adjusting rod is moved axially to the right, in Fig. 2, by rotating adjusting nut member 40, the portion of the spring 35 located between the disk member 49 and the partition wall 48 will be compressed. Immediately upon release of the adjusting nut 40, the spring will expand and return the disk member 49 and its associated adjusting rod 36 back to the neutral position, as seen in Fig. 2. Conversely, if the left end of the spring 35 is compressed by moving the adjusting rod to the left, as viewed in Fig. 2, release of the adjusting nut 40 permits the compressed left end portion of the spring to return the disk and its associated adjusting rod 36 to the neutral position, seen in Fig. 2. It will be understood that the adjusting rod 36 is constructed for limited axial movement and any axial movement thereof which varies from the neutral position of Fig. 2 will cause at least one end of coil spring 35 to be compressed, whereby, immediately upon release of the adjusting nut 40, the disk member 49 and its associated adjusting rod 36 will return to the neutral position, as seen in Fig. 2.

Means is provided for adjustably securing the movable gauge block to the adjusting rod at any point along the length of the rod between the upstanding ends 13 and 19 of the gauging device. Said means includes a tubular guide member 55 which extends transversely through the side wall of the block 25, through an elongated slot 28a in the bearing retainer 28 and through an elongated longitudinally extending slot 56 provided in the side of guide tube member 23 into sliding engagement with the rod 36. As seen in Fig. 3, the tubular guide member 55 is provided with a bore 57 adapted to slidably receive the adjusting rod 36. The tubular guide member 55 is also provided with an elongated bore 58 adapted to receive a rod 59 which is flattened at its inner end and urged (through a helical spring engaged between rod 59 and screw 60) into engagement with one of the flat sides of the hexagonal shaped adjusting rod 36, by means of a set screw 60 which threadedly engages the inner surface of an enlarged portion 58a of bore 58 provided adjacent the outer end of the tubular guide member 55. Thus, by tightening the set screw 60, the inner end of the rod 59 is forced against one of the flat surfaces of the adjusting rod and retains the movable gauge block at any desired point along the length of the adjusting rod 36. Since the tubular guide member 55 is always in sliding engagement with the adjustable rod 36, it provides a permanent guide for the rod 59. The purpose of the elongated slot 28a in the bearing retainer member 28 is to permit limited relative movement of the retainer 28 and its associated ball bearings, with respect to the guide tube 23 and the movable gauge block 25. The bearing retaining member 28 will move a longitudinal distance equal to approximately one-half of the distance through which the movable gauge block 25 travels. This is due to the rolling engagement between balls 27 and tube 23 during such movement of block 25.

Figure 4:
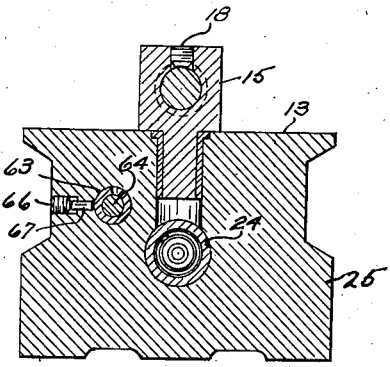
Fig. 4 is a transverse vertical sectional view taken along the plane of line 4—4 of Fig. 1.
Figure 5:
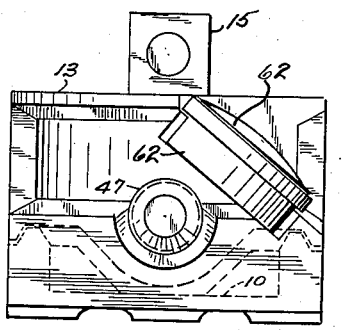
Fig. 5 is an end elevational view, as seen from the left, of Figs. 1 and 2.

The upper left end portion of the integral upstanding end 13, as seen in Figs. 1 and 2, is cut out so as to provide a space for mounting a dial indicator 62. The upstanding end 13 is bored horizontally to receive a sleeve 63 (Fig. 4) which in turn receives stem 64 of the dial indicator. The indicator is of standard form and has a graduated dial swept by a pointer 65 responsive to axial movement of a plunger in stem 64. The indicator is held in place by means of a set screw 66 and a rod 67 engaging sleeve 63. The indicator has an actuator in the form of a spring urged plunger 68 reciprocable in alignment with stem 64 and having its axis in a plane substantially parallel to that of the base 10 and directed toward the movable gauge block 25. The point of plunger 68 is in constant contact with a feeler pin 70 which extends between the movable gauge block and said plunger. The feeler pin 70 is fixed intermediate its ends within a suitable bore 71 having a split liner 74 therein, provided in the movable gauge block 25 and adjustably retained therein by means of a set screw 72 which forces a rod 73, contained in a transversely extending bore provided in the side wall of the movable gauging block, against the side wall of the liner 74 which in turn frictionally engages and retains the feeler pin. As seen in Fig. 5, the dial indicator 62 is supported at an angle which makes it more readily seen by the operator.

Figure 6:
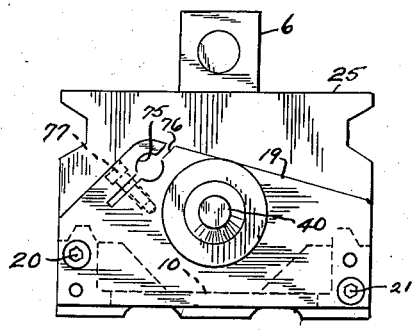
Fig. 6 is an end elevational view, as seen from the right, of Figs. 1 and 2.

Means is also provided at the right end of the gauging device, as seen in Figs. 1 and 2 for supporting a dial indicator. Here, the means comprise a horizontal bore 75, as seen in Figs. 1 and 6 axially aligned with pin 70, and a slot 76 which extends inwardly from the outer surface of the upstanding end member 19 diametrically through the bore 75 and terminates a distance beyond the bore 75, within the material of the end member 19. A suitable lock screw 77 extends through the two portions of the end member 19 separated by said slot and provides means for bringing said portions toward each other whereby the neck of the dial indicator may be securely retained within the bore 75. If the dial indicator 62 is placed in the bore 75 of the right-hand end portion 19, it will be understood that the right end of the feeler pin 70, as seen in Fig. 1, will be used to contact the plunger 68 of the dial indicator. Tightening of the lock screw 77 clamps the neck of the dial indicator 62 within the bore 75.

The movement of the feeler pin 70, in response to movement of gauge block 25 according to variation in size of the test specimens, is indicated on the dial indicator 62.

The present gauging device is particularly suited and designed for measuring a plurality of test specimens, all of which should have measurements which fall within certain tolerances. For example, suppose the block A, as seen in Fig. 2, is a standard or master test block having precise, known dimensions and in addition there are a plurality of other test specimens which are to be measured to determine whether their dimensions fall within the tolerable limits of the master test block A. In order to obtain an accurate or true gauge reading of the measurement of the test specimens, it is desirable to exert the same pressure on the side walls of the specimens, as heretofore described. Thus, in setting up the gauging apparatus, the operator would move the movable gauge block 25, as seen in Fig. 2, toward the stationary gauge block 13 so that the gauging point 7a would be located in the dotted line position 7b wherein it is spaced from the stationary gauging point 16a a distance less than the actual dimension to be measured. Set screw 60 is then tightened whereby rod 59 engages the adjusting rod 36 so that the movable gauge block 25 is securely locked to the adjusting rod 36 at this desired position. It will be remembered that the adjusting rod 36 at this time is in a neutral position; that is to say, the left end of the rod has its enlarged disk member 49 in a neutral position with respect to the coil spring 35, as heretofore explained. In order to accommodate the master block A, it will be necessary to move the movable gauge block to the right by turning the adjusting nut 40 in a direction wherein adjusting rod 36 is moved to the right, as viewed in Fig. 2, thereby compressing the portion of coil spring 35 contained between the disk 49 and partition 48. The indicia 43 of ring 42 are calibrated to measure the ounces of pressure exerted by the compressed coil spring 35 due to the adjusting rod being moved to the right or left, as viewed in Fig. 2. It will be understood that the amount which the spring 35 is compressed while moving the movable gauge block into the position as seen in Fig. 2, so that it may accommodate the test specimen A, is accurately measured by the indicia 43. It will now be seen that upon release by the operator of the adjusting nut 40 the movable gauging point 7a will be forced against the test block with the pressure exerted by the compressed portion of spring 35 tending to push the adjusting rod 36 to the left into a neutral position. The amount of pressure exerted by the coil spring 35 is dependent upon how much the spring 35 is compressed which in turn depends upon the amount the adjusting rod 36 is moved to the right beyond the neutral position, as seen in Fig. 2. As the movable gauge block is moved from the dotted line position 7b to the right, as seen in Fig. 2, the coil spring portion between the disk 49 and the partition 48 is compressed, as heretofore explained so that when the gauging points 16a and 7a are spaced a distance greater than the dimension of the test specimen A, as seen in Fig. 2, the tendency is for the compressed portion of the coil spring 35 to urge the disk portion 49 and its associated adjusting rod and the movable gauge block secured thereto toward the neutral position which, in other words, has the effect of moving the movable gauge block 25 to the left into the position seen in Fig. 2, upon release by the operator of the adjusting nut 40. However, the operator would not suddenly release the adjusting nut 40 but rather permits the spring 35 to slowly urge the movable gauge block 25 toward the stationary block 13 while his fingers, in contact with nut 40, control the speed with which the movable block travels to the left. Through this novel construction, it is possible to gain much more control of the movable gauge block and there is no tendency to apply additional, uncontrolled and unknown pressures against the test specimen upon contact therewith by the gauging points 16a and 7a. In the use of the present invention the distance between the gauging points 16a and 7a is first established by inserting the test block A therebetween in the manner as above described. Said test block is thence removed and a test specimen, the dimension of which is to be determined, is inserted between the aforesaid gauging points. The adjusting nut 40 is permitted to slowly turn until the gauging part 7a of the movable gauge block 25 touches the end face of the specimen. The operator thereafter completely releases the adjusting nut 40 and permits the spring 35 to exert a known pressure on the gauge block 25 through the adjusting rod 36 so that the gauging point 7a exerts a known and controlled pressure on the test specimen.

The pointer 65 of the dial gauge 62, which has been previously set to zero for one limit of the allowable tolerances measured by the standard test block A, will either remain at zero or show a variation on the allowable side, or beyond the allowable limit depending upon the actual dimension of the test specimen, as will be understood.

After the gauge reading has been indicated by the dial pointer 65, the operator may then rotate the nut 40 in the proper direction to draw the gauging point 7a away from the adjacent end face of said specimen whereby the latter may be readily removed from the gauge.

With the adjustable nut 40 retained in this position, the next specimen to be measured may be inserted between the gauging points 16a and 7a and the same procedure as outlined above is thereafter repeated. In each instance, after the specimen is properly positioned within the gauge, the adjusting nut 40 is first permitted to slowly rotate until the gauging point 7a controlled thereby touches the adjacent end face of the specimen. Thereafter, said nut is released and hence allows the spring 35 to automatically return the adjusting rod and associated movable gauging block and gauging point against the specimen being tested and toward their original prelocated position. Since the test specimens are close to the dimension of test block A, spring 35 will urge points 7a and 16a toward each other with almost exactly the same pressure during each test. Any variance between the dimension of the master test block A and the test specimen being tested will immediately show up on the dial indicator 62.

It is well known to form brackets which will fit into the bores 14 and 25a and support sleeves on vertical axes in the open space between the blocks 13 and 25 whereby gears may be mounted on shafts rotatable in their respective sleeves so that a production gear may be rotated while in mesh with a master gear to check the accuracy of the production gear.

It will be understood that a substantially frictionless mounting is provided for the right end of adjusting rod 36, as seen in Fig. 2, by means of the roller bearing 39 between the spindle 38 and the cylindrical housing 22, whereby the mechanism contained in the housing 22, including the adjusting nut 40, is freely rotated in response to stress exerted thereon by the compressed coil spring 35. Thus, the coil spring 35, if compressed, can always move the adjusting rod 36 back to its neutral position, as seen in Fig. 2, upon release of the adjusting nut 40 by the operator. Bearings 27, 29 and 30 provide substantially frictionless movement of block 25 relative to tube 23.

Having thus described my invention and illustrated its use, what I claim is new and desire to secure by Letters Patent is:

1. A gauge comprising a supporting structure, a pair of cooperating gauging blocks mounted on said supporting structure, a center tube mounted on said supporting structure and extending longitudinally thereof between said cooperating gauging blocks, at least one of said gauging blocks mounted on said center tube for guided movement toward and away from the other of said gauging blocks, loose bearing means between said movable gauging block and said center tube, said loose bearing means being adapted for endwise movement independent of relative movement between said movable gauging block and said center tube, a guideway on each side of said center tube extending substantially parallel to said center tube, said guideways being closely associated with said supporting structure, and together with said center tube providing a three point support for said movable gauging block, and indicating means operatively connected to said movable gauging block and responsive to the relative positions of said cooperating gauging blocks.

2. A gauge comprising a supporting structure, a pair of cooperating gauging blocks mounted on said supporting structure, guide means mounted on said supporting structure and extending longitudinally thereof between said cooperating gauging blocks, at least one of said gauging blocks mounted on said guide means for guided movement toward and away from the other of said gauging blocks, said guide means comprising three spaced parallel guideways, friction reducing means between said movable gauging block and each of said guideways, means for adjusting said friction reducing means between said movable gauging block and at least one of said guideways whereby a three point contact between said guideways and said movable gauging block may be at all times maintained, and indicating means operatively connected to said movable gauging block and responsive to the relative positions of said cooperating gauging blocks.

3. A gauge comprising a supporting structure, cooperating gauging blocks mounted on said supporting structure, a center tube mounted on said supporting structure and extending longitudinally thereof between said cooperating gauging blocks, at least one of said gauging blocks mounted on said center tube for guided movement toward and away from the other of said gauging blocks, a guideway on each side of said center tube, said guideways extending substantially parallel to said center tube, said center tube and guideways forming a three point support for said movable gauging block and adjustable means between said block and at least one of said guideways whereby said movable gauging block may always be maintained in three point supporting contact with said center tube and said guideways, and indicating means operatively connected to said movable gauging block and responsive to the relative positions of said cooperating gauging blocks.

4. A gauge comprising a supporting structure, a pair of cooperating gauging blocks mounted on said supporting structure, a center tube mounted on said supporting structure and extending longitudinally thereof between said cooperating gauging blocks, at least one of said gauging blocks mounted on said center tube for guided movement toward and away from the other of said gauging blocks, loose bearing means between said movable gauging block and said center tube, said loose bearing means being adapted for endwise movement independent of relative movement between said movable gauging block and said center tube, a guideway on each side of said center tube extending substantially parallel to said center tube, said guideways being closely associated with said supporting structure, and friction reducing means between said movable gauging block and said guideways.

5. A gauge comprising a supporting structure, a pair of cooperating gauging blocks mounted on said supporting structure, a center tube mounted on said supporting structure and extending longitudinally thereof between said cooperating gauging blocks, at least one of said gauging blocks mounted on said center tube for guided movement toward and away from the other of said gauging blocks, loose bearing means between said movable gauging block and said center tube, said loose bearing means being adapted for endwise movement independent of relative movement between said movable gauging block and said center tube, a guideway on each side of said center tube extending substantially parallel to said center tube, said guideways being closely associated with said supporting structure, friction reducing means between said movable gauging block and said guideways, and means for adjusting said friction reducing means so as to always be in contact with said movable gauging block and said guideways.

6. A gauge comprising a supporting structure, cooperating gauge members carried by said supporting structure, a center tube on said supporting structure extending longitudinally thereof, a movable gauge member slidably engaging said central tube means for movement toward and away from its associated gauge member, a guideway on each side of said center tube extending parallel to said center tube, said guideways being secured to said supporting structure, frictionless bearing means between said movable gauge member and said guideways, and means for adjusting said frictionless bearing means in the movable block relative to said guideways, and indicating means operatively connected to said movable gauge member and responsive to the relative positions of said cooperating gauge members.

7. A gauge comprising a supporting structure, a pair of cooperating gauging blocks mounted on said supporting structure, a center tube mounted on said supporting structure and extending longitudinally thereof between said cooperating gauging blocks, at least one of said gauging blocks mounted on said center tube for guided movement toward and away from the other of said gauging blocks, loose bearing means between said movable gauging block and said center tube, said loose bearing means being adapted for endwise movement independent of relative movement between said movable gauging block and said center tube, a guideway on each side of said center tube extending substantially parallel to said center tube, said guideways being closely associated with said supporting structure, and together with said center tube providing a three point support for said movable gauging block, friction reducing means between said movable gauging block and said guideways, said friction reducing means comprising bearings rotatably mounted in said movable gauging block.

8. A gauge comprising a supporting structure, a pair of cooperating gauging blocks mounted on said supporting structure, a center tube mounted on said supporting structure and extending longitudinally thereof between said cooperating gauging blocks, at least one of said gauging blocks mounted on said center tube for guided movement toward and away from the other of said gauging blocks, loose bearing means between said movable gauging block and said center tube, said loose bearing means being adapted for endwise movement independent of relative movement between said movable gauging block and said center tube, a guideway on each side of said center tube extending substantially parallel to said center tube, said guideways being closely associated with said supporting structure, and together with said center tube providing a three point support for said movable gauging block, friction reducing means between said movable gauging block and said guideways, said friction reducing means comprising bearings rotatably mounted in said movable gauging block, and adjusting means for moving at least one of said bearings relatively toward or away from its associated guideway.

9. A gauge comprising a supporting structure, a pair of cooperating gauging blocks mounted on said supporting structure, a center tube mounted on said supporting structure and extending longitudinally thereof between said cooperating gauging blocks, at least one of said gauging blocks mounted on said center tube for guided movement toward and away from the other of said gauging blocks, loose bearing means between said movable gauging block and said center tube, said loose bearing means being adapted for endwise movement independent of relative movement between said movable gauging block and said center tube, a guideway on each side of said center tube extending substantially parallel to said center tube, said guideways being closely associated with said supporting structure, and together with said center tube providing a three point support for said movable gauging block friction reducing means between said movable gauging block and said guideways, said friction reducing means comprising bearings rotatably mounted in said movable gauging block, and adjusting means for moving at least one of said bearings relatively toward or away from its associated guideway, said adjusting means comprising a central shaft for said movable bearing, said central shaft having an eccentric portion capable of adjusting said movable bearing so that it will always be in contact with its associated guideway.

10. A gauge comprising a supporting structure, cooperating gauging blocks mounted on said supporting structure, tube means mounted on said supporting structure and extending longitudinally thereof between said cooperating gauging blocks, at least one of said gauging blocks mounted on said tube means for guided movement toward and away from the other of said gauging blocks, a guideway on each side of said tube means extending substantially parallel to said tube means, said guideways being closely associated with said supporting structure, and together with said tube means providing a sliding support for said movable gauging block friction reducing bearing means rotatably mounted between said movable gauging block and each of said guideways, eccentric means associated with at least one of said bearing means for maintaining said bearing means in contact with its associated guideway and indicating means operatively connected to said movable gauging block and responsive to the relative positions of said cooperating gauging blocks.

11. A gauge comprising a supporting structure, a pair of cooperating gauging blocks mounted on said supporting structure, a stationary hollow center tube mounted on said supporting structure and extending longitudinally thereof between said cooperating gauging blocks, a movable one of said gauging blocks slidably mounted on said center tube, a rod contained in said hollow center tube extending longitudinally thereof and adapted for limited longitudinal movement, means adjustably connecting said movable gauging block to said rod through suitable openings in said hollow center tube for moving said movable block in response to axial movement of said rod, spring means operatively connected with said rod normally urging said rod into a neutral stationary position, finger engageable means operatively connected to said rod and permitting an operator to move said rod out of its neutral position against the resistance of said spring means, said spring means urging said rod back to said neutral position upon release of said finger engageable means by said operator, means associated with said gauge indicating the force exerted by said spring in returning rod to said neutral position, friction reducing bearing means between said movable gauge member and said center tube, and indicating means operatively connected to said movable gauging block and responsive to the relative positions of said cooperating gauging blocks.

12. A gauge comprising a supporting structure, a pair of cooperating gauging blocks mounted on said supporting structure, a center tube mounted on said supporting structure and extending longitudinally thereof between said cooperating gauging blocks, a movable one of said gauging blocks slidably mounted on said center tube, a rod mounted on said supporting structure and extending longitudinally thereof and adapted for limited longitudinal movement, means adjustably connecting said movable gauging block to said rod for moving said movable block in response to axial movement of said rod, resilient means operatively connected with said rod normally urging said rod into a neutral position, finger engageable means operatively connected to said rod and permitting an operator to move said rod out of its neutral position against the resistance of said resilient means, said resilient means urging said rod back to said neutral position upon release of said finger engageable means by said operator, means associated with said gauge indicating the force exerted by said resilient means in returning said rod to said neutral position, friction reducing bearing means between said movable gauge member and said center tube, and indicating means operatively connected to said movable gauging block and responsive to the relative positions of said cooperating gauging blocks.

13. A gauge comprising a supporting structure, a pair of cooperating gauging blocks mounted on said supporting structure, a center tube mounted on said supporting structure and extending longitudinally thereof between said cooperating gauging blocks, a movable one of said gauging blocks slidably mounted on said center tube, a rod mounted on said supporting structure and extending longitudinally thereof and adapted for limited longitudinal movement, means adjustably connecting said movable gauging block to said rod for moving said movable block in response to axial movement of said rod, resilient means operatively connected with said rod normally urging said rod into a neutral position; finger engageable means operatively connected to said rod and permitting an operator to move said rod out of its neutral position against the resistance of said resilient means, said resilient means urging said rod back to said neutral position upon release of said finger engageable means by said operation, and indicating means operatively connected to said movable gauging block and responsive to the relative positions of said cooperating gauging blocks.

14. A gauge comprising a base member, spaced guideways formed on said base member and extending longitudinally therealong, cooperating gauge members carried on said guideways, at least one of said gauge members being slidable on said guideways for movement toward and away from the other of said cooperating gauge members, frictionless bearing means between said movable gauge member and at least one of said guideways, and means for adjusting said frictionless bearing means in a plane that is substantially normal to the plane of said one guideway to effect a predetermined alignment of said movable gauge member relative to said guideways.

15. A gauge as defined in claim 14 and wherein the adjusting means for said frictionless bearing means includes means operatively connected to said bearing means being eccentric relative to the axis of said bearing means and actuatable to adjustably move the same and effect a predetermined alignment of said movable gauge member relative to said guideways.

16. A gauge comprising a base member, spaced guideways formed on said base member and extending longitudinally therealong, cooperating gauge members carried on said guideways, at least one of said gauge members being slidable on said guideways for movement toward and away from the other of said cooperating gauge members, frictionless bearing means between said movable gauge member and at least one of said guideways, a shaft movably carried within said movable gauge member, an eccentric on said shaft operatively connected with said bearing means, said shaft being movably actuatable to carry said eccentric therewith and adjustably move said bearing means relative to said movable gauge member and effect a predetermined alignment of said movable gauge member relative to said guideways.

17. A gauge comprising a supporting structure, a guideway on each side of said structure extending longitudinally therealong, cooperating gauge members carried by said supporting structure, at least one of said gauge members being slidable on said guideways for movement toward and away from the other of said cooperating gauge members, frictionless bearing means between said movable gauge member and said guideways, and means on the movable gauge member for adjusting said frictionless bearing means in a direction substantially normal to said guideways.

18. A gauge comprising a supporting structure, a guideway on each side of said structure and extending longitudinally therealong, a center tube mounted on said supporting structure and extending between said guideways, cooperating gauge members carried on said center tube and said guideways, at least one of said gauge members being slidable on said tube and guideways for movement toward and away from the other of said cooperating gauge members, frictionless bearing means between said movable gauge member and at least one of said guideways, and means for movably adjusting said frictionless bearing means in a plane that is substantially normal to the plane of said one guideway to effect a predetermined alignment of said movable gauge member relative to said center tube and guideways.

References Cited in the file of this patent

UNITED STATES PATENTS

| | | |
|---|---|---|
| 1,981,153 | Schoof | Nov. 20, 1934 |
| 2,170,747 | Dimond | Aug. 22, 1939 |
| 2,578,615 | Twardowski | Dec. 11, 1951 |
| 2,636,278 | Krause | Apr. 28, 1953 |
| 2,863,221 | Toubhans | Dec. 9, 1958 |

FOREIGN PATENTS

| | | |
|---|---|---|
| 584,462 | Great Britain | Jan. 15, 1947 |